(12) United States Patent
Powers

(10) Patent No.: US 11,188,631 B2
(45) Date of Patent: Nov. 30, 2021

(54) MULTI-FACTOR AUTHENTICATION UTILIZING NON-CENTRALIZED KEY CREATION WITH PHYSICAL RANDOMNESS

(71) Applicant: PAYPAL, INC., San Jose, CA (US)

(72) Inventor: Joshua Buck Powers, Chandler, AZ (US)

(73) Assignee: PAYPAL, INC., San Jose, CA (US)

( * ) Notice: Subject to any disclaimer, the term of this patent is extended or adjusted under 35 U.S.C. 154(b) by 184 days.

(21) Appl. No.: 16/512,259

(22) Filed: Jul. 15, 2019

(65) Prior Publication Data

US 2021/0019387 A1 Jan. 21, 2021

(51) Int. Cl.
| | |
|---|---|
| G06F 21/00 | (2013.01) |
| G06F 21/34 | (2013.01) |
| G07C 9/00 | (2020.01) |
| G06F 21/36 | (2013.01) |
| G06F 21/45 | (2013.01) |

(52) U.S. Cl.
CPC .............. *G06F 21/34* (2013.01); *G06F 21/36* (2013.01); *G06F 21/45* (2013.01); *G07C 9/00571* (2013.01)

(58) Field of Classification Search
CPC .......... G06F 21/34; G06F 21/36; G06F 21/45; G07C 9/00571; G07C 9/00174; G07C 9/00563
See application file for complete search history.

(56) References Cited

U.S. PATENT DOCUMENTS

| | | | |
|---|---|---|---|
| 2008/0231418 A1* | 9/2008 | Ophey | G02B 27/00 340/5.85 |
| 2016/0377423 A1* | 12/2016 | Eilers | H04L 63/08 356/601 |
| 2018/0345904 A1* | 12/2018 | Moore | G07C 9/00174 |
| 2020/0153624 A1* | 5/2020 | Wentz | G06F 21/32 |
| 2020/0300002 A1* | 9/2020 | Castle | B65D 41/34 |
| 2021/0110624 A1* | 4/2021 | Taylor | G07C 9/00309 |

\* cited by examiner

*Primary Examiner* — Jeffrey C Pwu
*Assistant Examiner* — William A Corum, Jr.
(74) *Attorney, Agent, or Firm* — Haynes and Boone, LLP

(57) ABSTRACT

Methods and systems are provided for a multi-factor authentication technique that includes inputs of a physical key possessed by the user as a factor. Such a key may be a physical object that the user possesses and that includes truly random features not easily reproducible. The key may be custom to the user and may include inclusions or anomalies that affect a signal transmitted through the key. Such effects may impart a unique effect on signals transmitted through the key, producing a unique fingerprint to identify whether the key is authentication. An input from the user may be an additional factor within the authentication process.

18 Claims, 19 Drawing Sheets

1730A →

1730B →

US 11,188,631 B2

MULTI-FACTOR AUTHENTICATION UTILIZING NON-CENTRALIZED KEY CREATION WITH PHYSICAL RANDOMNESS

BACKGROUND

Field of the Invention

The present invention generally relates to multi-factor authentication techniques, and more particularly to multi-factor authentication techniques using physical keys.

Related Art

Multi-factor authentication is commonly used in authentication processes, such as for access to online sites, restricted content, and the like, to provide additional security over single factor authentication, e.g., use of a password or a biometric. Typically, multi-factor authentication involves the use of two or more pieces of data in the authentication process. Such data is generally two pieces of information input by the user. However, even multi-factor authentication can be spoofed and/or hacked by malicious actors. Additionally, such techniques lack true randomness. True randomness is much harder to spoof, and thus increases security.

Figure 1:
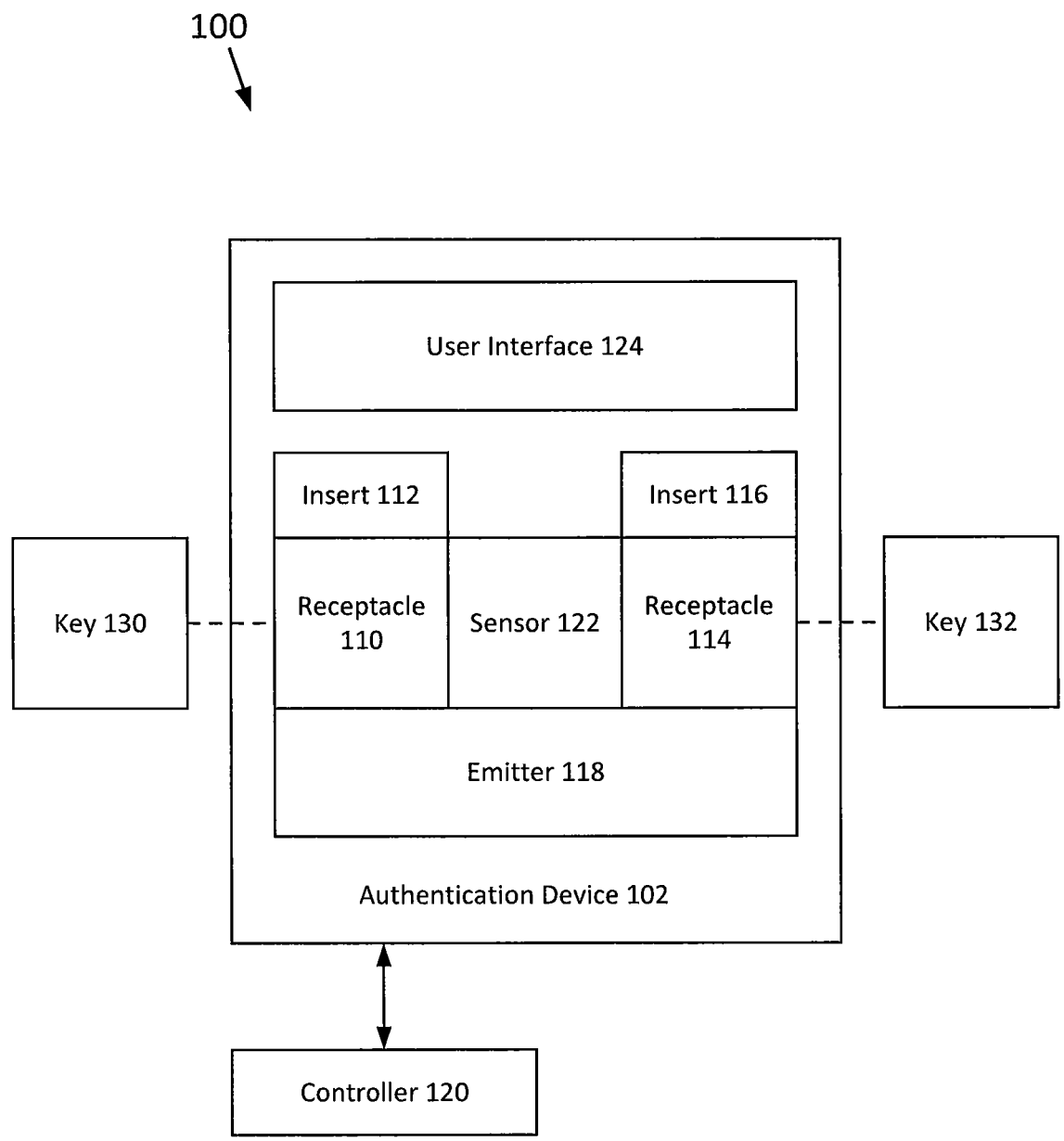
FIG. 1 is a schematic diagram showing a system according to an embodiment of the disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods that allow for authentication of a user. The techniques may authenticate a user through a multi-factor technique that includes a plurality of inputs. One of the inputs may be an input of something that the user knows and another one of the inputs may be an input of a physical object, such as a key, that the user possesses. The key may include truly random features not easily reproducible.

During the authentication process, the key may be inserted into a lock. The lock may project a signal (e.g., sound or electromagnetic signal) through the key and identify whether the key is authentic determined from the signal projected or transmitted through the key. In certain embodiments, the key may be custom to the user and may include inclusions or anomalies that affect the signal transmitted through the key (e.g., can affect the color or intensity of light transmitted through the key). Such effects may produce a unique signal (e.g., unique changes to the signal) for the signals transmitted through the key, producing a unique fingerprint to identify whether the key is authentic.

Furthermore, the user may input a code during the authentication process. The authenticity of the user may be further identified based on the code inputted. In certain embodiments, the code may affect the signal emitted (e.g., change a color of a light emitted by the lock). As such, authentication of the user based on the code inputted may be directly through the input (e.g., determining whether the input is correct) or indirectly through the input (e.g., authenticating the key through signals emitted through the key may be based on the color of a light after the light has been shined through the key and the starting color of the light may be dependent on the input and, thus, the final light color detected by sensors of the lock may be incorrect if the initial light is incorrect).

The systems and techniques described herein include a lock and a key that includes physical randomness. In certain embodiments, the key may be inserted into a receptacle of the lock. The key may be a semi-transparent key with physical randomness. The semi-transparency of the key allows for the light to be scattered in ways that are not predictable and such randomness prevents duplication. In certain embodiments, once the key is inserted into the lock, a user may input a code or other data. The input may denote, for example, one or more values (e.g., red green blue values, also known as RGB values) that controls a signal emitter such as a light within the lock. The emitter may emit signals through the key according to the values. Thus, the emitter may emit light with RGB values of the RGB values input. The colored light can travel through the key, and the light after traveling through the key may be read as a fingerprint by the lock to validate the user.

The systems and techniques described herein may allow for authenticating of an environment around the lock, preventing fraud from offsite areas. As the ambient light around the lock is typically consistent, if the lock is moved or modified, the resulting fingerprint may change and keys will not be authenticated. Furthermore, the lock may also be fingerprinted as, if the lock is modified, the resulting fingerprint may be changed due to changes to the lock and keys will not be authenticated.

FIG. 1 is a schematic diagram showing a system according to an embodiment of the disclosure. It can be appreciated that the system illustrated in FIG. 1 may be deployed in other ways and that the operations performed and/or the services provided by the electronic devices described herein may be combined or separated for a given implementation and may be performed by a greater number or fewer number of devices.

FIG. 1 illustrates a system 100 that includes an authentication device 102, keys 130 and 132, and a controller 120. In certain embodiments, controller 120 may be separate from authentication device 102 and communicatively coupled (e.g., may transmit data to and receive data from) to authentication device 102. In other embodiments, controller 120 may be integrated within authentication device 102.

Authentication device 102 may include a user interface 124, receptacles 110 and 114, inserts 112 and 116, a sensor 122, and an emitter 118. Each of receptacles 110 and 114 may be configured to receive a physical key, such as one of keys 130 or 132. Emitter 118 may be configured to emit a signal through one or both of receptacles 110 and 114. The signal may be, for example, light, sound waves, heat, or another such signal. While system 100 illustrates an embodiment where emitter 118 may emit a signal into one or both of receptacles 110 and 114, other embodiments may include separate emitters for each receptacle.

Sensor 122 may be configured to detect signals emitted by emitter 118. Thus, sensor 122 may be coupled to one or both of receptacles 110 and 114 and configured to receive signals within receptacles 110 and 114. In certain embodiments, sensor 122 may be disposed within an opening within one or both of receptacles 110 and 114. Sensor 122 may be one or more of a light sensor, a sound sensor, a thermal sensor, and/or another type of sensor configured to detect the corresponding signals. While system 100 illustrates an embodiment with a single sensor 122 coupled to both receptacles 110 and 114 and configured to receive signals from either, other embodiments may include separate sensors for each receptacle where each sensor is configured to detect signals within each single receptacle.

User interface 124 may include components (e.g., touch screens, a mouse, a keyboard, and other input device) that may receive user inputs, provide outputs to the user, and/or otherwise operate authentication device 102 (e.g., by controlling operations of emitter 118, such as the color of a light output by emitter 118).

Inserts 112 and 116 may be disposed on a side of receptacles 110 and 114, respectively. Thus, receptacles 110 and 114 may include features such as slots that can receive inserts 112 and 116. Inserts 112 and 116 may change a property of receptacles 110 and 114, respectively. For example, inserts 112 and 116 may be colored and, thus, affect the color of the light emitted through receptacles 110 and 114 or may be sound insulation configured to affect sound emitted through receptacles 110 and 114.

Controller 120 may be communicatively coupled to authentication device 102. In various embodiments, controller 120 may be communicatively coupled to emitter 118, sensor 122, and/or user interface 124. Controller 120 may include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices of controller 120. Controller 120 may include a database that includes data identifying inputs and/or sensor readings for authenticating a user. Such inputs and/or sensor readings may be associated with the user.

Keys 130 and 132 may be keys with physical randomness. Keys 130 and 132 may be any appropriate size and shape and made from any suitable materials that enable signals to be transmitted through the key and received by sensors for processing. Receptacles 110 and 114 may be sized and shaped according to the size and shape of keys 130 and 132. In certain embodiments, keys 130 and/or 132 may be inserted into receptacles 110 and/or 114 in a plurality of different orientations. Due to the features of keys 130 and 132, the resulting sensor readings of different orientations of keys 130 and 132 may be different. The correct orientation may be known to a user, but not a fraudster, and thus, orientation of keys 130 and 132 may be a further factor in authenticating the user. Certain embodiments may require the user to orient one or both of keys 130 and 132 in a plurality of different orientations during the authentication process or may require keys 130 and 132 to be placed in different orientations for different authentication levels (e.g., different orientations may be required for authentication to access a bank account versus authentication to access an e-mail account or between accounts of higher and lower security requirements).

Furthermore, keys 130 and/or 132 may be created by a user. Keys 130 and/or 132 may be, for example, a material such as epoxy that is cast by a user within a mold. The user may color the material as desired (e.g., by mixing food coloring or other coloring into the epoxy). The casting process may create inclusions or anomalies within keys 130 and/or 132 such as bubbles and other inclusions or anomalies. The inclusions or anomalies may affect the transmission of signals through keys 130 and/or 132. Furthermore, keys 130 and/or 132 may be polished or otherwise finished by the user as desired. Controller 120 may store data related to the characteristics of signals transmitted through keys 130 and 132 based on the inclusions or anomalies and the finishing.

In certain embodiments, controller 120 may deny access to, for example, an account of the user if authentication fails. In other embodiments, controller 120 may alert the account operator of a failed authentication attempt and/or provide an alarm by authentication device 102.

Figure 2:
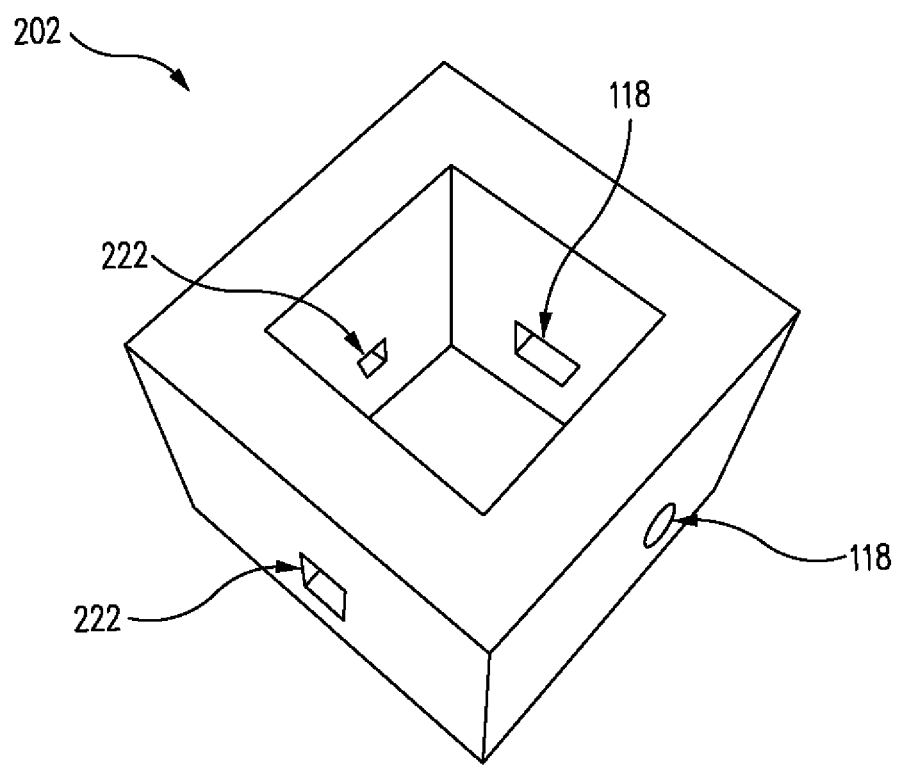
FIG. 2 is a perspective view showing an example of a lock according to an embodiment of the disclosure.

FIG. 2 is a perspective view showing an example of a lock according to an embodiment of the disclosure. FIG. 2 illustrates an authentication device 202 with emitters 118 and sensors 222. As shown, authentication device 202 may include one receptacle having a plurality of emitters 118 and sensors 222 disposed within the one receptacle. Each of sensors 222 may be configured to receive signals emitted by corresponding inline oriented emitters. In certain embodiments, emitters 118 may be, for example, light emitting diodes, lightbulbs, or other light emitting devices. Correspondingly, sensors 222 may be photoresistors, charged coupled devices, or other light sensors configured to detect a color and/or intensity of light.

Figure 3:
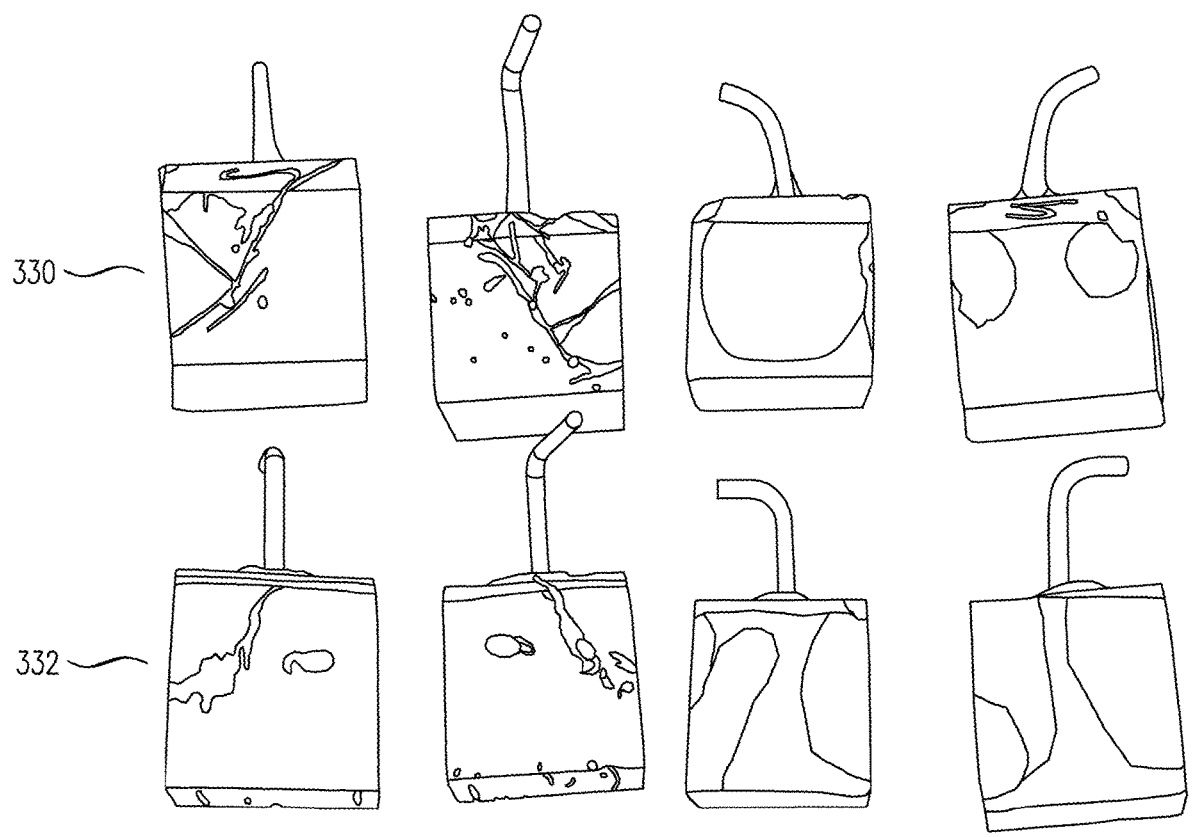
FIG. 3 are views showing examples of keys according to an embodiment of the disclosure.

FIG. 3 are views showing examples of keys according to different embodiments of the disclosure. FIG. 3 illustrates keys 330 and 332 oriented in four different positions. As shown, keys 330 and 332 may be hand built semi-transparent keys that each include bubbles, cracks, and other inclusions or anomalies within the structure of keys 330 and 332. Keys 330 and 332 include a handle for insertion and extraction into receptacles of corresponding locks.

Figure 4:
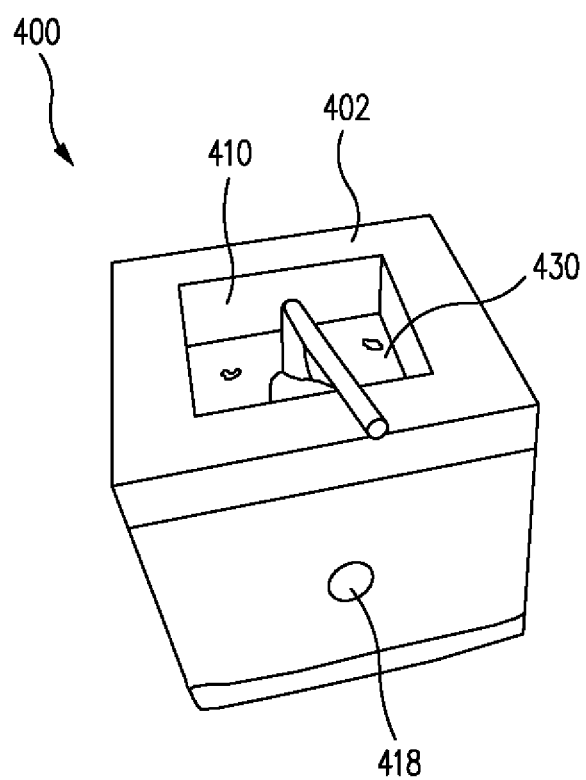
FIG. 4 is a perspective view showing a lock receiving a key according to an embodiment of the disclosure.

A key inserted into a lock is shown in FIG. 4. FIG. 4 is a perspective view showing a lock receiving a key according to an embodiment of the disclosure. FIG. 4 illustrates a system 400 that includes an authentication device 402 with a receptacle 410. Key 430 is inserted into receptacle 410. Emitter 418 may emit a signal through key 430, such as a light. The signal may be detected by a sensor (not shown) disposed within or outside of receptacle 410, such as when the receptacle has an opening that allows signals to be passed to a sensor outside the receptacle.

In certain embodiments, authentication device 402 and/or receptacle 410 may be different colors. For example, receptacle 410 may be white to increase reflectivity and decrease light loss, may be black to decrease reflectivity and increase light loss, or may be a color such as red to change the color of light passing within receptacle 410 (e.g., the emitter may emit a white light, but a red receptacle 410 may effectively change the color of light passing within receptacle 410 and within key 430).

Figure 5:
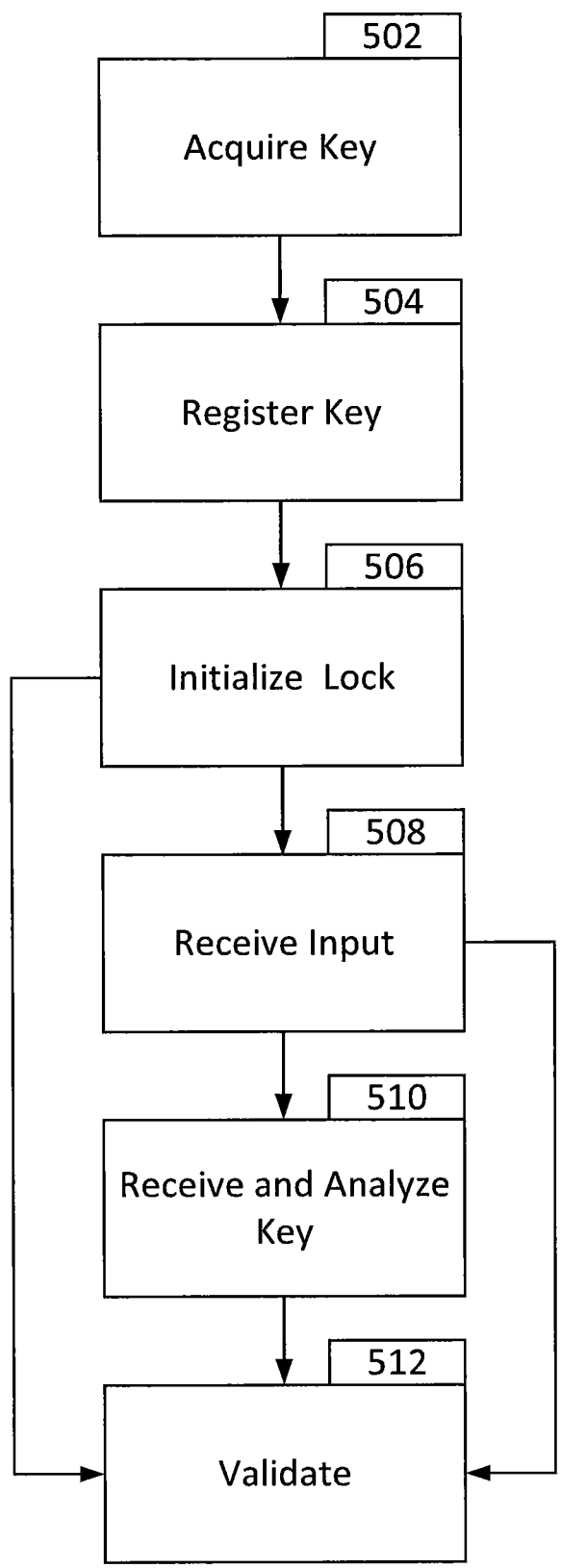
FIG. 5 is a flowchart detailing a technique of using a key with a lock for authentication according to an embodiment of the disclosure.

FIG. 5 is a flowchart detailing a technique of using a key with a lock for authentication according to an embodiment of the disclosure. FIG. 5 illustrates an authentication technique using the items described herein.

In block 502, a user may acquire a key. The user may acquire a key from a service associated with an authentication device (e.g., from a merchant or service provider), from a third party, or manufacture their own key.

In block 504, characteristics of the key may be registered. For example, the key may be inserted into a receptacle of the key and signals (e.g., light, audio, or other signals) may be emitted by the lock through the key and detected by a sensor of the lock. The characteristics of the signal emitted through the key may be detected by the sensor and determined accordingly. The inclusions or anomalies and properties of the key (e.g., inclusions or anomalies, tint, or other properties of the key) may change characteristics of the signal passing through the key. Such characteristics may be stored for future authentication. The key may be inserted multiple times to obtain an average of the readings to mitigate spurious signals, such as through variations of the signals transmitted, the physical environment of the lock, and how the key is inserted or otherwise displayed within the receptacle.

In certain other embodiments, the lock may also be registered. Registration of the lock may be performed by emitting the signal within the lock while no key is inserted to obtain a baseline reading or emitting the signal with the key and obtaining a baseline reading as such. Again, multiple readings may be made and averaged to account for different variations, which may result in a more accurate baseline reading.

After the on-boarding process of blocks 502 and 504, the authentication device may be used for authenticating a user in blocks 506 to 512. Thus, blocks 506 to 512 may be performed at a time period later than the time period where blocks 502 and 504 were performed.

In block 506, the lock (i.e., the authentication device) may be initialized. The lock may be powered on and/or connected to a power source. In certain embodiments, during the initialization of the lock, ambient conditions may be determined by the lock. Thus, the lock may emit a signal without the key being inserted. The signal emitted may be detected and ambient conditions may be determined from the signal emitted. For example, a certain lock may generally be used in an indoor area in controlled lighting conditions. During initialization of the lock, the ambient conditions may be detected to determine if the lock in this instance is being used in conditions that match the indoor area with controlled lighting conditions. If the conditions do not match, certain embodiments may output a warning or not authenticate the user.

After the lock is ready for use, a user interface of the lock may receive a user input in block 508. In certain embodiments, the input may be directed to the signal emitted by the lock. As such, the user input may specify one or more characteristics of a signal emitted by the lock. In embodiments where the lock is configured to emit light as a signal, the user input may specify a color (e.g., RGB value), duration, intensity, change in characteristics (e.g., pulses of one or more lights, changes in light color, changes in light intensity, or other changes in characteristics), or other characteristics of the emitted light. In embodiments where the lock is configured to emit sound as a signal, the user input may specify a volume, amplitude, durations, and any changes in the sound. Other embodiments may utilize other signals and the user interface may specify properties of those signals accordingly.

In block 510, the key may be inserted into the receptacle and the signal may be emitted by the lock through the key. Properties of the signal may change when the signal passes through the key (e.g., due to features of the key). For example, for light-based signals, the color, the intensity, hot spots (e.g., where light is more concentrated), and/or other properties of the light-based signal may change. Sound-based signals may change in, for example, amplitude, pitch, or other characteristics. The features of the key that changes such characteristics may be random features of the key created from, for example, imperfections during manufacture of the key. One or more sensors of the lock may receive the signal that passes through the key.

In block 512, based on the signal detected by the sensor, authentication of the user may be performed. The signal detected by the sensor may be compared to previous signals detected for the key (e.g., in block 504) to authenticate the user. If the detected signal does not match or substantially match (e.g., be within 95% of the value of the stored intensity or pixel values or other predetermined threshold, which may be based on the reason for the authentication, e.g., access of more secure information may require a higher threshold) stored values, authentication of the user may be rejected. If authentication of the user is rejected, the authentication device may output a visual or audible warning signal on the device itself (e.g., through the user interface), communicate (e.g., over a network) that authentication of the user failed to a party maintaining the user account (e.g., to lock the account), or may simply prevent the user from accessing the account.

In certain embodiments, the input of the user may also be a part of the authentication process. The input may be directly matched with stored outputs previously provided by the user (e.g., in block 504). In other embodiments, the inputs may control the characteristics of the signal emitted and, thus, an input that does not match the proper input will create an improper emitted signal that will result in an improper detected signal. Thus, the improper input will result in a detected signal that does not match and the input itself may accordingly not need to be detected and compared.

Additionally, the initial conditions determined in block 506 may also be used as a factor during authentication. If the initial conditions do not match, the authentication may also fail, e.g., stored conditions indicate dry, hot conditions, while the detected conditions when authenticating the user indicate moist, cold conditions. Stored conditions may include different environments the user expects to be in for authentication. In certain embodiments, the initial ambient conditions may also affect the signal detected by the sensor. Thus, in those embodiments, the initial ambient conditions may not be directly detected, but may simply affect the signals detected.

Authentication based on the signals, whether emitted through the key or to detect ambient conditions, may be though, for example, matching signals detected to stored data associated with signals indicating an authentic user. The data from the sensor may be analyzed to determine characteristics of interest of the signals. Such characteristics may include the characteristics described herein. FIGS. 6-13 illustrates various examples of how data may be analyzed to determine the characteristics of the signals detected.

Figure 6:
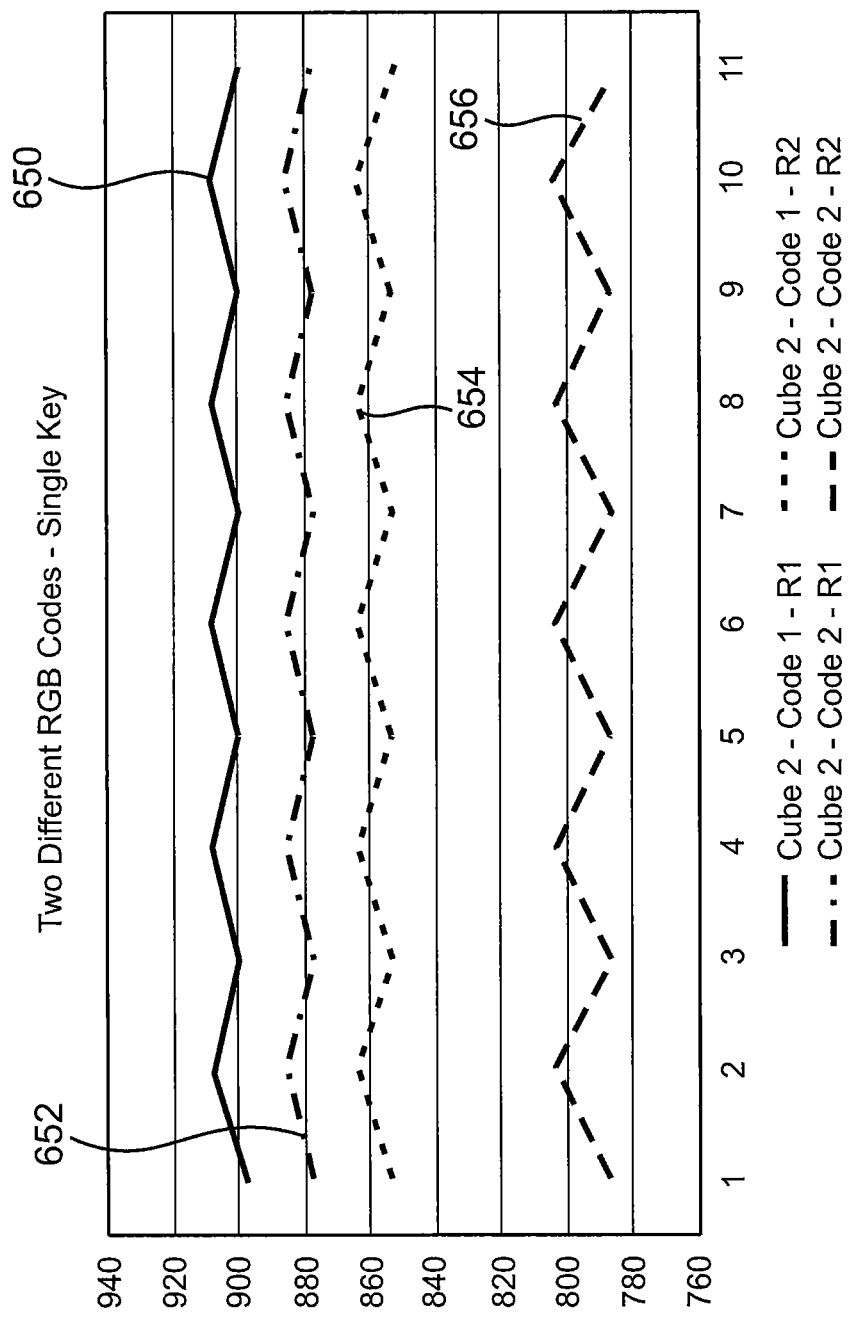
FIGS. 6-13 are charts showing various authentication results and techniques for use with locks and keys, according to embodiments of the disclosure.

FIGS. 6-13 are charts showing various authentication results and techniques for use with locks and keys, according to embodiments of the disclosure. FIG. 6 illustrates a graph with the y-axis showing RGB values and the x-axis showing 11 different samplings. FIG. 6 includes plots 650, 652, 654, and 656 where the same key and lock are sampled with two different codes (e.g., light-based codes with different colors). Plots 650 and 654 detail situations where a first code is sampled. Plots 652 and 656 detail situations where a second code is sampled. Plots 650 and 652 are sampled in a first environment while plots 654 and 658 are sampled in a second environment.

As shown in FIG. 6, the different colors of plots 650 and 652 return different sensor readings that are consistent and repeatable, allowing for consistent differentiation between codes of different colors. Additionally, plots 650 and 654 as well as plots 652 and 656 illustrate that different ambient environments result in different readings that are still consistent. Thus, properties such as colors of light emitted through the key based on the ambient environment may be determined through sensor readings. Of note, all of plots 650-656 include slight variations between readings. As such, a lock may include a range that accounts for such variations between samplings and may authenticate a key even if the readings differ by some amount from a stored value or stored range (e.g., if a value is detected to be within 5 to 10% of the possible pixel values).

Figure 7:
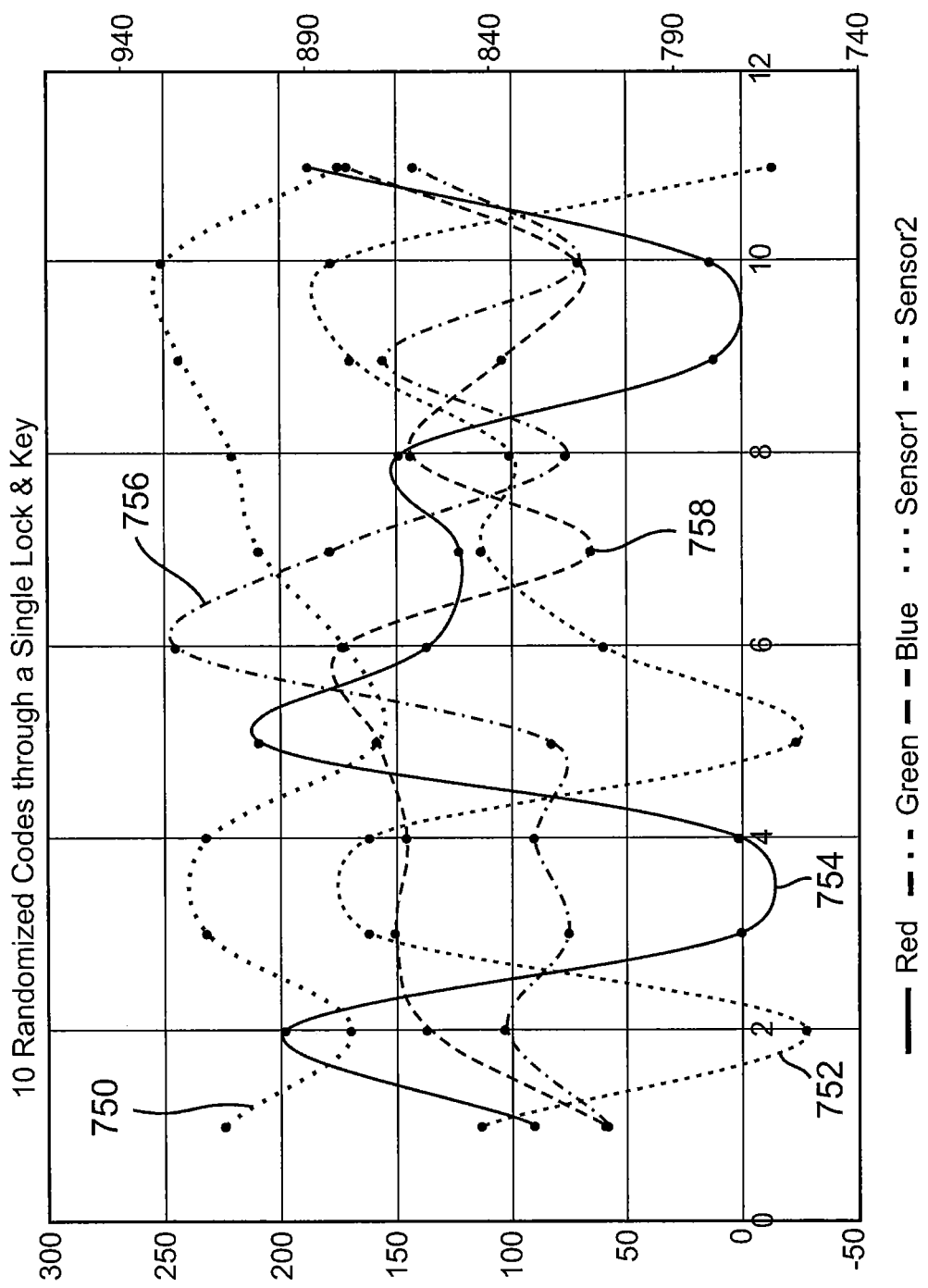

FIG. 7 illustrates an example situation where 10 random color-based codes are generated. Sensor readings of those codes, after passing through a key, are taken from two different sensors disposed within or outside a lock (e.g., on different sides of a rectangular receptacle). Plots 750 and 752 illustrate sensor value readings and are graphed against the right axis (with values of 740-960). Plots 754, 756, and 758 are the individual red, green, and blue (RGB) values plotted against the left axis (with values of 0-255). As shown in FIG. 7, the two sensors typically detect values with changes between different codes in the same direction (e.g., between samples 1 and 2, both sensors show a decrease in value while, between samples 2 and 3, both sensors show an increase in value). However, the magnitude of the changes between the sensor readings differ. Thus, sensors located in different locations can perceive or receive signals in different ways to changes of color emitted by the lock.

In certain embodiments, for light-based authentication techniques, a time element may also be used to authenticate the user. For example, in certain embodiments, the sensor may allow for the signal to be emitted and propagated for a set amount of time before detecting the signal, to avoid transient characteristics of the light and to allow the light levels to stabilize. In other embodiments, the ambient light level may be captured, and the emitter may be turned on for a set amount of time after capturing of the ambient light level. Sensor readings of the light may be captured from when it was ambient to when light is emitted to when conditions return back to ambient. Once the sensor readings return to ambient, the data may be analyzed to determine the length of time that the signal was emitted. In certain such embodiments, the light emitted may change a plurality of times (e.g., change colors or intensity a plurality of times for a set amount for each stage). The amount of time of each stage and/or total time when the light may be controlled by the user input. The amount of time of each stage and/or total time may be detected to authenticate the user.

In certain embodiments, a combination of color and time-based authentication techniques may be used. Additionally, the techniques described herein may be used to compensate for ambient light. During initialization of the lock, the ambient conditions may be measured. A difference between the current ambient conditions (during the authentication process, such as during block 506 of FIG. 5) and ambient conditions during the onboarding procedure (e.g., during block 504 of FIG. 5) may be determined. The differences may be compensated for when the key is authenticated.

Figure 8:
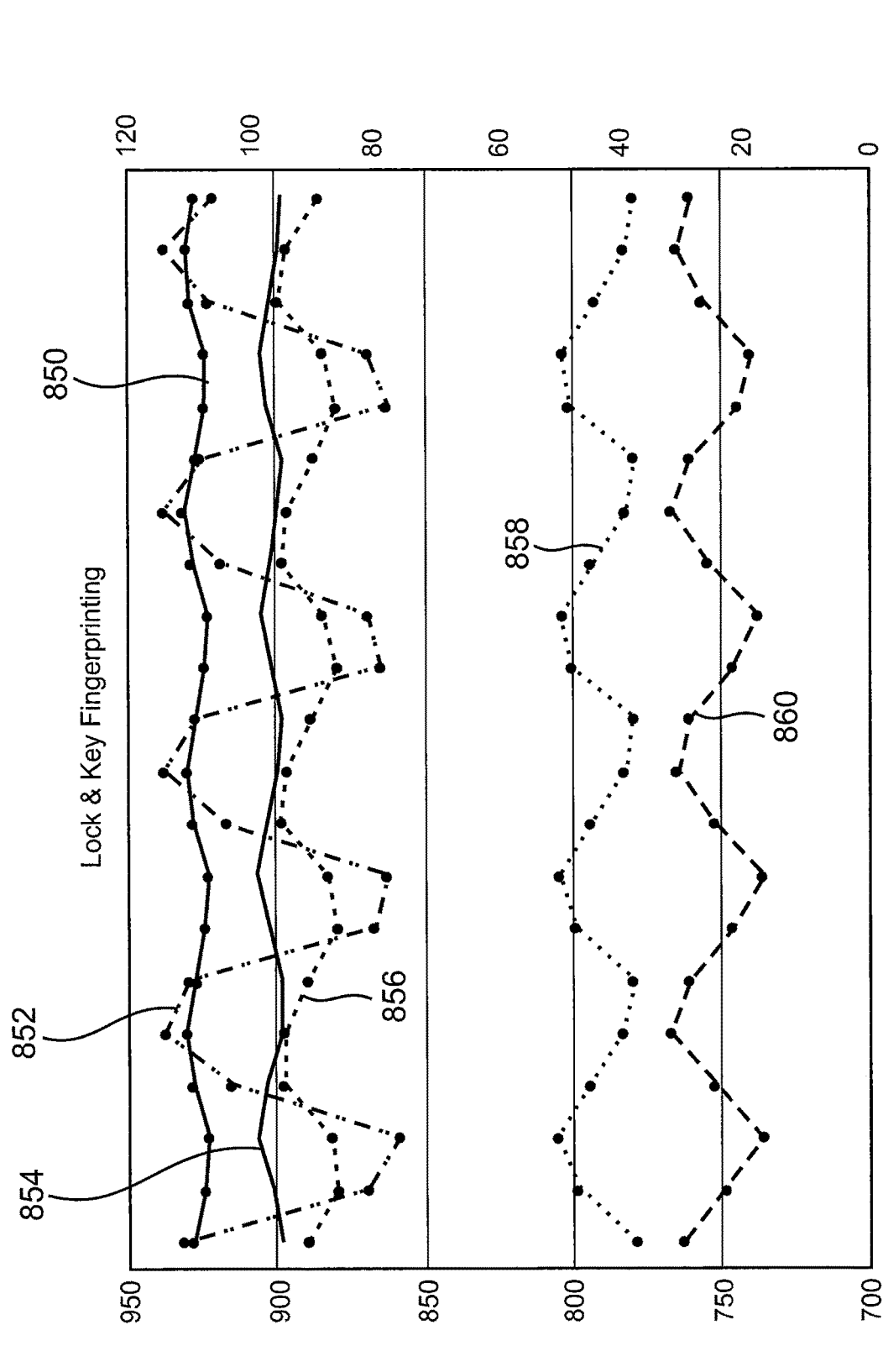

FIG. 8 illustrates an example of such a technique. In FIG. 8, plots 850-856 illustrate readings from sensors when an authentication technique is performed. Sensor reading values are plotted against the left axis while differences are plotted against the right axis. Plots 850 and 856 are readings from sensors when no key is inserted. Plots 854 and 858 are readings from sensors when a key is inserted. Plot 860 is the difference between the values of plots 850 and 856 while plot 852 is the difference between the values of plots 854 and 858.

As shown, differences in ambient conditions result in predictable changes in readings when a key is inserted. Additionally, based on the sensor reading with the key inserted, the typical difference in ambient conditions may be predicted as the delta changes in a predictable manner. Such changes in delta may be used to authenticate the lock as well as the key. When the delta is not within a predicted delta range (e.g., within 5% or 10% of a predicted value), the lock may be determined to be fraudulent and authentication may fail.

Figure 9:
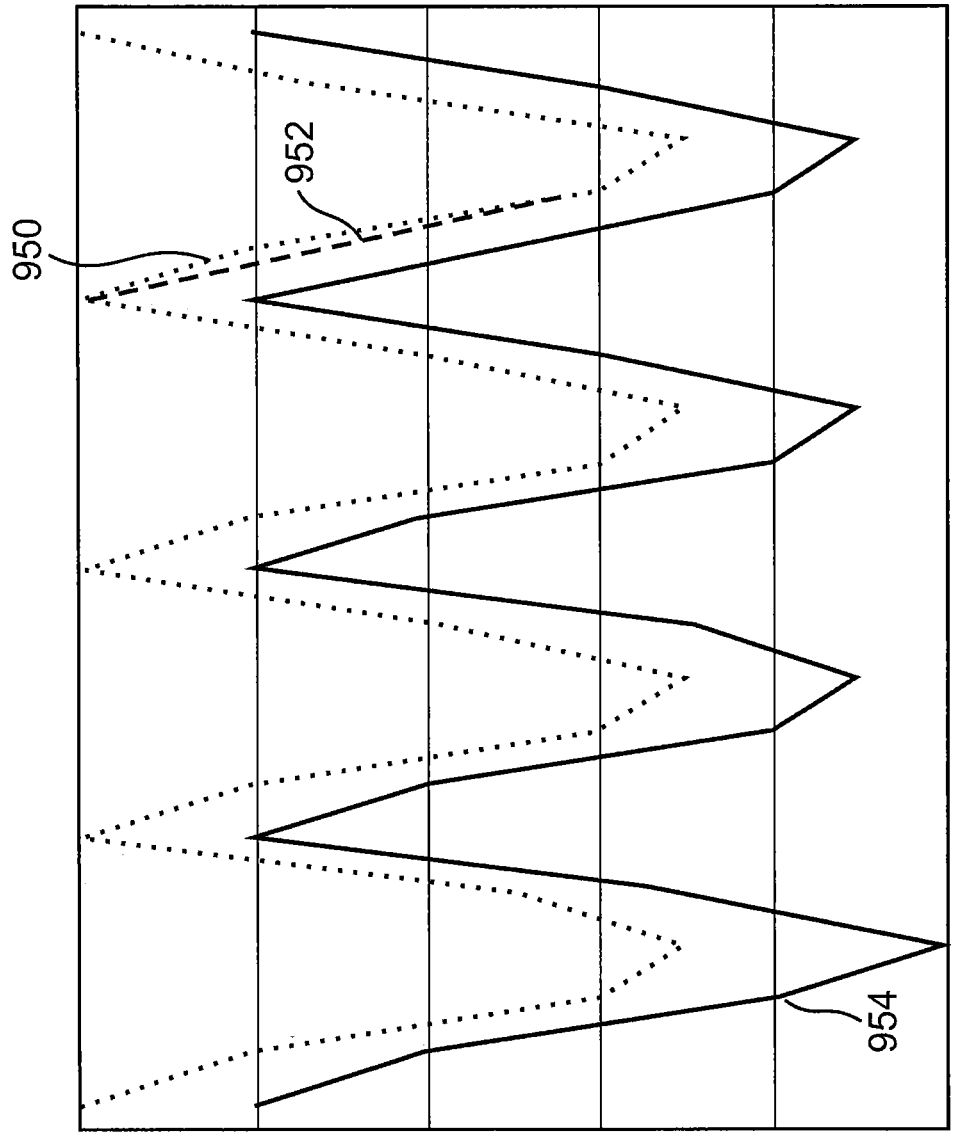

The faces of locks may be changed to vary readings of the sensor. FIG. 9 illustrates an example where the reflectivity of a face of the receptacle with no sensor is changed. For example, a face that was previously white in color is changed to black with a black insert. Plot 950 shows readings of a secondary sensor opposite from that of the face that is changed. As shown in plot 952, once the face is changed, the reading of the sensor is changed as well. Furthermore, plot 954 shows the readings of a primary sensor where the insert is not within the light path of the sensor. As shown, even with the insert, the readings of the sensor of plot 954 is not changed.

Thus, the properties of the faces of the lock can be changed (e.g., with inserts) and the resulting differences can be determined from the sensor. Additionally, based on readings from two different sensors, which side of a receptacle has had its properties changed can also be determined. Accordingly, in certain embodiments, the authentication techniques described herein may also be dependent on changing the properties of one or more faces of the receptacle (e.g., with inserts). Furthermore, the technique may be dependent on which of the faces is changed.

Figure 10:
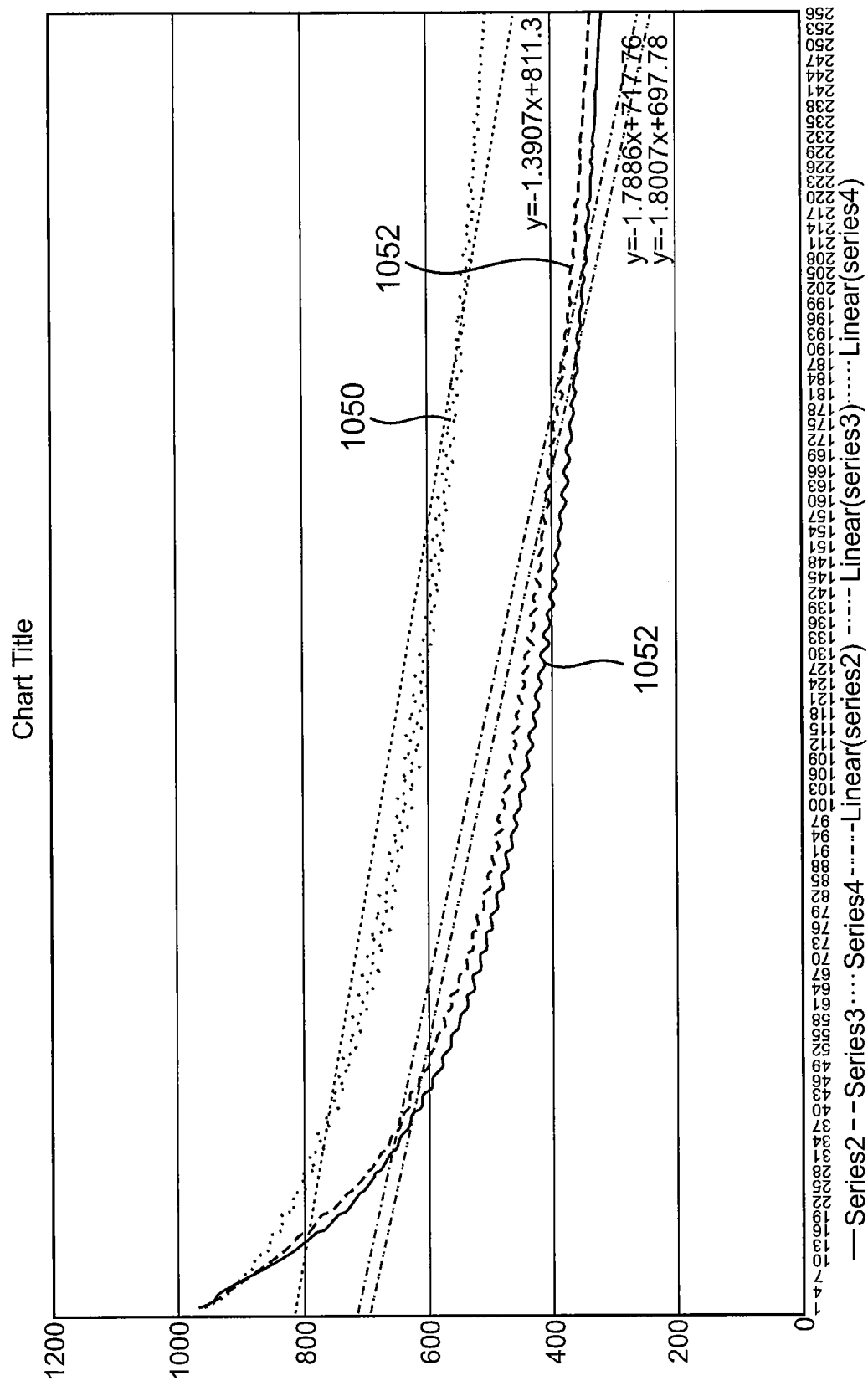
Figure 11:
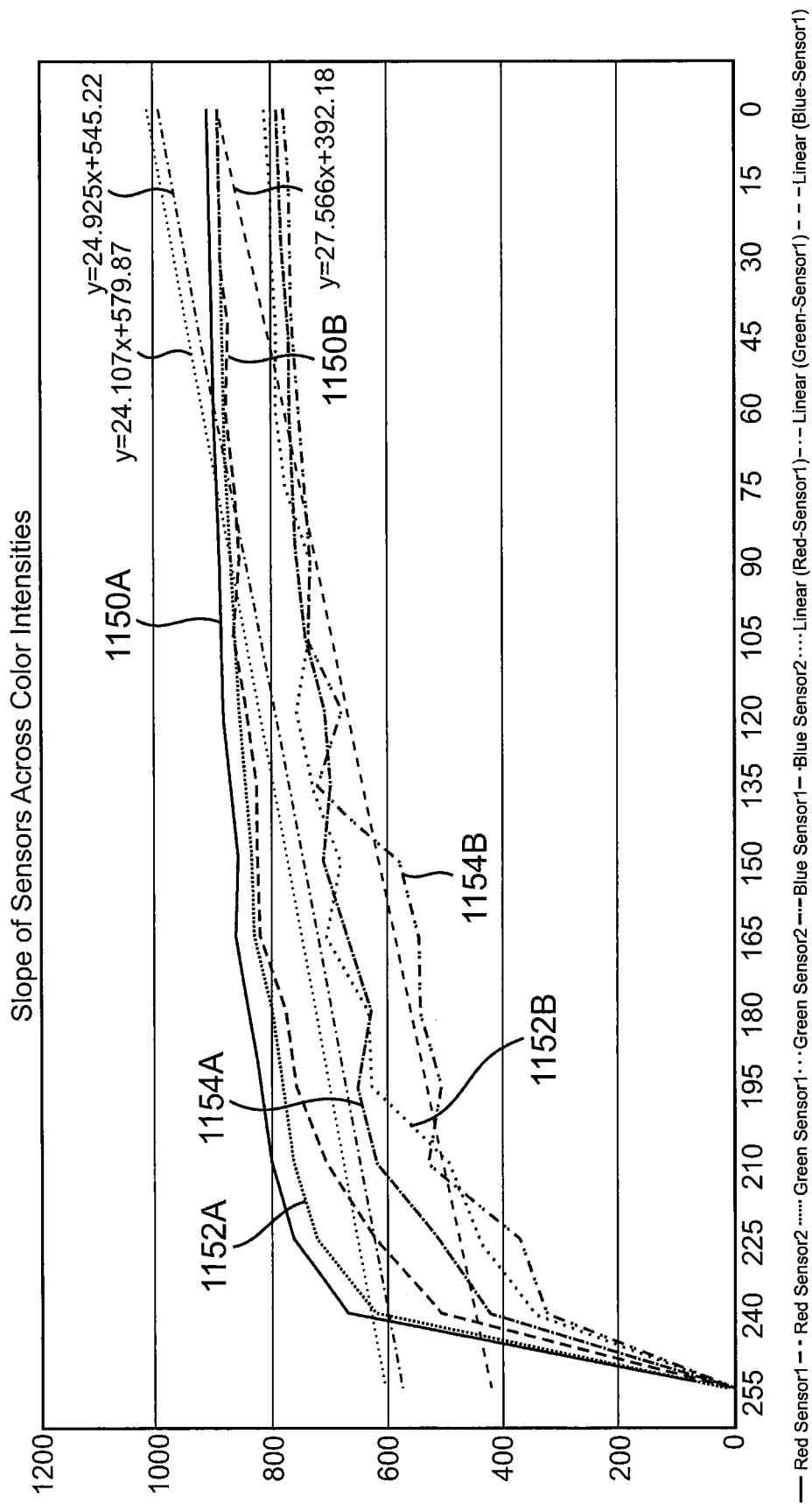

In certain embodiments, the sensor may be a photoresistor. While photoresistors are typically unable to directly detect color, FIG. 10 illustrates that color may be indirectly determined from photoresistor readings. Photoresistors detect light with a delay. Plot 1050 illustrates the response of a photoresistor to blue light. Plot 1052 illustrates the response of a photoresistor to red light. Plot 1054 illustrates the response of a photoresistor to green light. The lights are all of the same intensity in FIG. 10. As shown, photoresistors respond differently to different colored light as plots 1050 to 1054 are all of different slopes. Thus, the color of the light can be determined from how photoresistors respond.

The plots of FIG. 10 include an up and down sawtooth shape, referred to as jitter. Jitter may be due to properties of the sensor or the controller (e.g., due to the CPU of the controller). Jitter may be compensated for by injecting a delay in the measurement to smooth out the readings. FIG.

11 illustrates an example where jitter is compensated for. Plots 1150A, 1152A, and 1154A are plots of a first sensor of a lock responding to red, green, and blue light, respectively. Plots 1150B, 1152B, and 1154B are plots of a second sensor of the lock responding to red, green, and blue light, respectively. As shown, jitter of the readings is compensated for and the plots are much smoother. Jitter may be further illustrated in FIG. 13.

Figure 13:
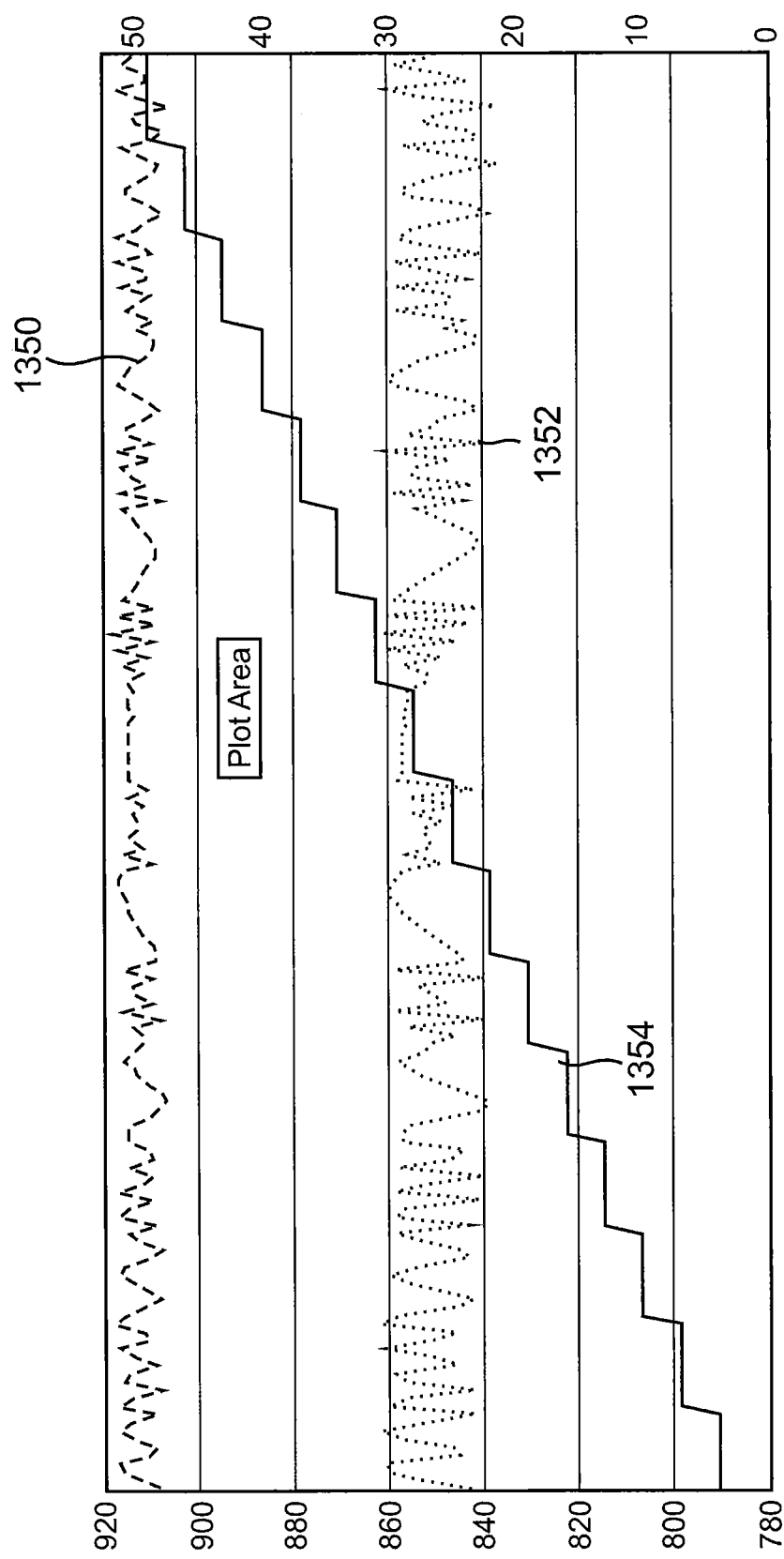

Referring to FIG. 13, plots 1350 and 1352 show sensor readings of two sensors of a lock at various levels of delay (plotted against the left axis). As shown in plots 1350 and 1352, there is jitter within the sensor readings due to the relatively slow clock rate of the controller. Plot 1354 illustrates a delay of the reading, plotted against the right axis. As shown, compensating for the delay is more complicated than simply adding a delay that is a multiple of the cycle time of the processor. As shown in FIG. 13, a sweep (within a second range of, for example, 0 to 100 milliseconds) can be performed with multiple delays to determine which delay minimizes the jitter. In FIG. 13, a delay of approximately 27 milliseconds results in minimized jitter, but other embodiments may perform best with another delay value.

Figure 12:
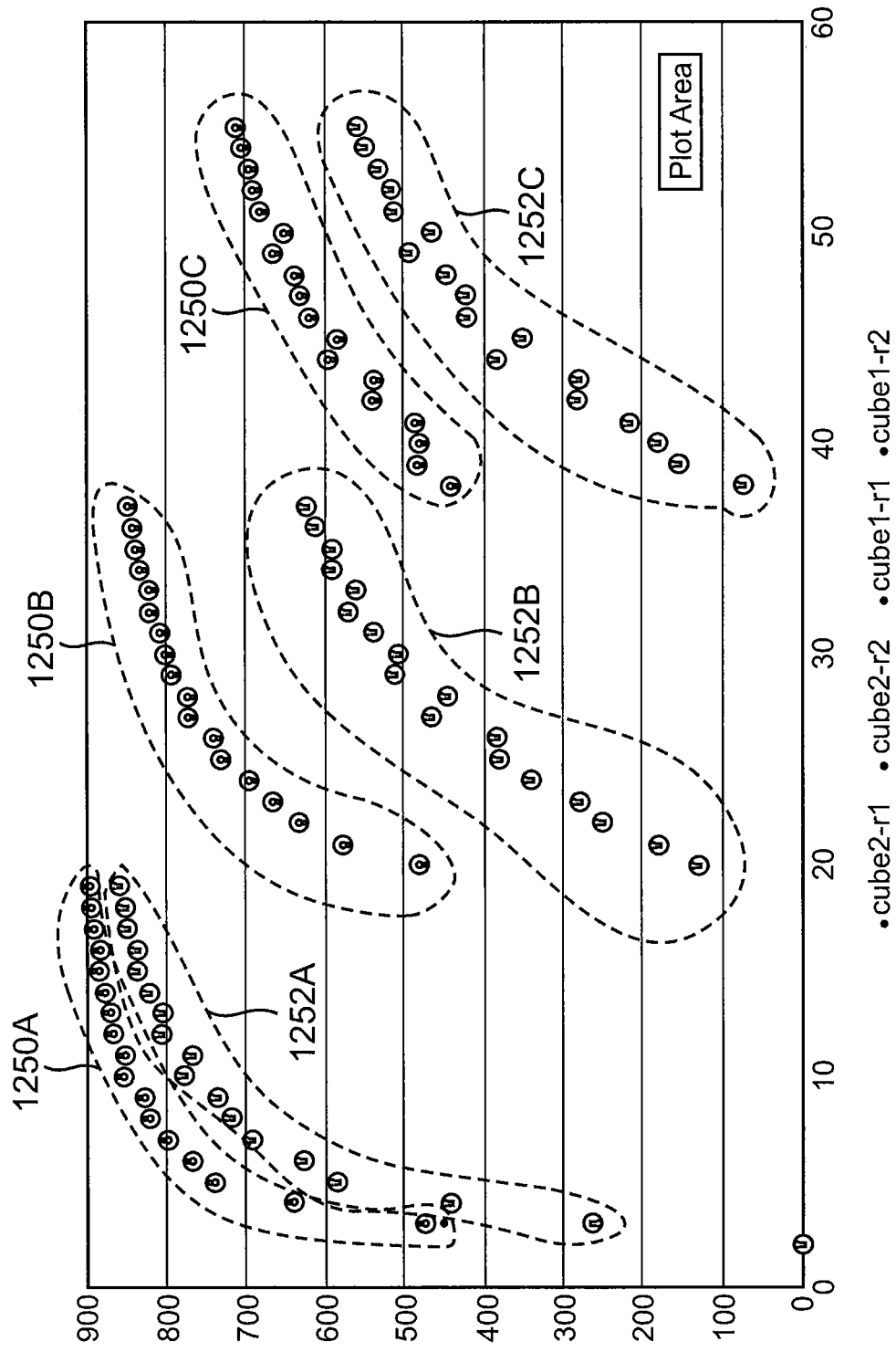

Now referring to FIG. 12, FIG. 12 illustrates a technique of using range analysis to determine the identity of a key based on previously measured values of the keys. Measurements of the same key with the same signal may result in variations in sensor readings between different measurements. However, the variations are typically within a set grouping. Groups 1250A-C are groupings of measurements of a first key with three different signals. Groups 1252A-C are groupings of measurements of a second key with three different signals.

As shown, while the readings can change between different measurements, the same key will return readings within a set grouping. Thus, based on the measurements, whether the key is the first key or the second key may be determined based on the readings and where within the groups the reading falls. Additionally, the differences in groupings are different between different signals. For example, the differences between the keys are less for the first signal than for the second signal. As such, multiple signals may be emitted to further aid in determining an identity of a key (e.g., when the first signal does not allow for an accurate determination of the identity of the key to a lack of difference in the readings, the second signal may be emitted).

Figure 14:
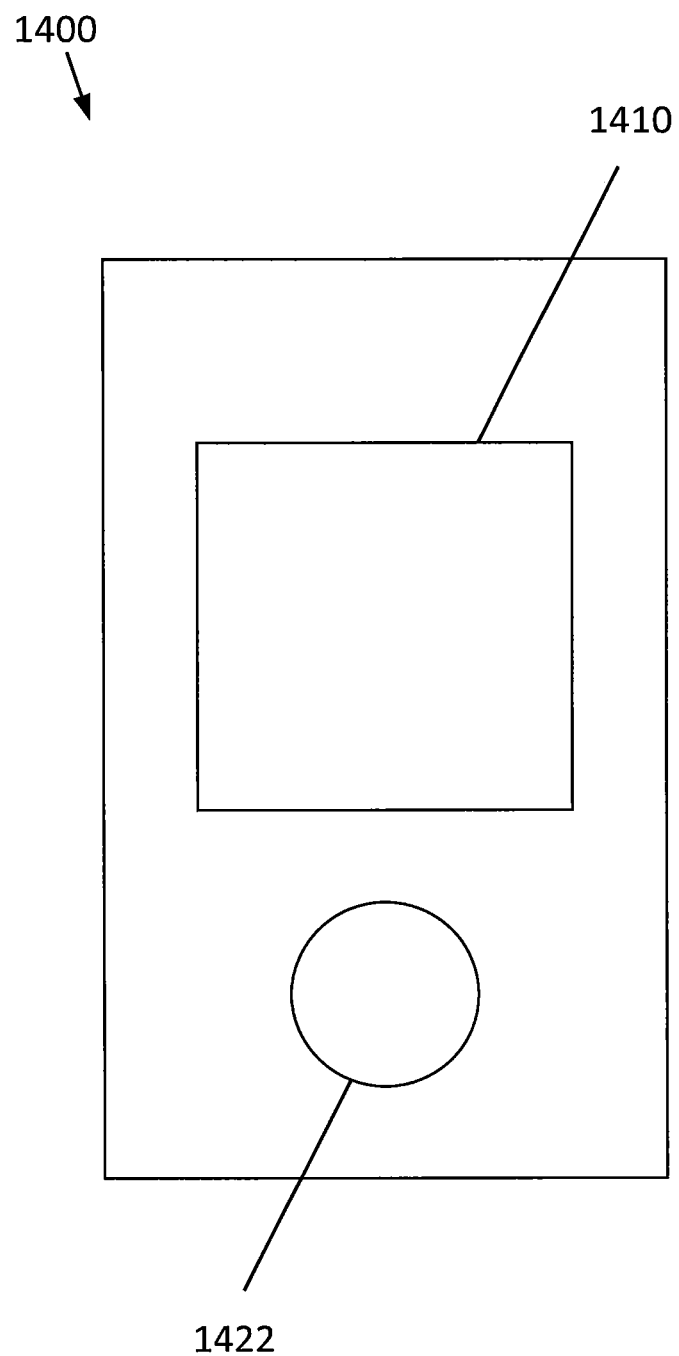
FIG. 14 is a schematic diagram of an electronic ticket according to an embodiment of the disclosure.

FIG. 14 is a schematic diagram of an electronic ticket according to an embodiment of the disclosure. FIG. 14 illustrates an electronic ticket 1400 that has a multi-day shelf life, cannot be transferred, and relies on biometrics (where a user's finger is the key) for authentication. In certain embodiments, electronic ticket 1400 may automatically expire when authentication is performed, but other embodiments may utilize electronic ticket 1400 for a plurality of authentications.

Electronic ticket 1400 includes a code section 1410 and a biometric sensor 1422. Biometric sensor 1422 may include a light or other sensor that reads a biometric characteristic of the ticket holder (e.g., a fingerprint). Thus, the user may be authenticated if the biometric characteristic matches that of stored data. If authenticated, code section 1410 may show a code such as a barcode for scanning.

Figure 15:
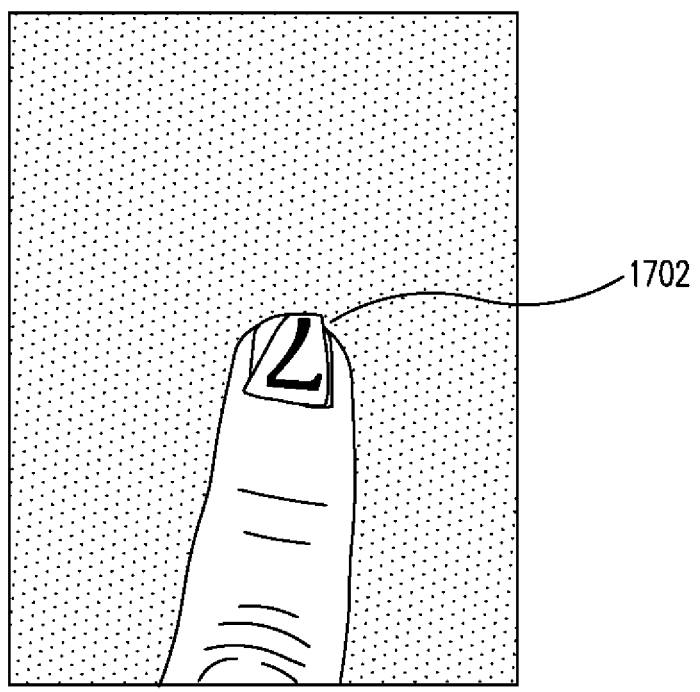
FIG. 15 is a representation of a key using a finger of a user according to an embodiment of the disclosure.

FIG. 15 is a representation of a key using a finger of a user according to an embodiment of the disclosure that can be used with the ticket of FIG. 14. While fingerprints are relatively easy to recreate, the pattern of blood vessels within a finger is far more difficult to recreate. FIG. 15 illustrates a fingernail code 1702. Fingernail code 1702 is configured to interact with the blood vessels in the finger to produce an authentication reading. Thus, light or another signaled communicated through the finger may be affected by fingernail code 1702.

A user with fingernail code 1702 printed or attached to their fingernail could be scanned during an authentication process. Fingernail code 1702 can be, for example, a sticker, a stick-on nail, laser etching performed on a fingernail, printed symbols or graphics on a finger nail, or other items disposed on the finger nail of a user. In certain embodiments, fingernail code 1702 may be configured to expire within a limited period of time and/or degrade and effectively expire after a limited timeframe (e.g., as fingernails grow and change position on the finger of a user, an etching on the finger nail may naturally lose effectiveness as an authentication device over time).

Figure 16A:
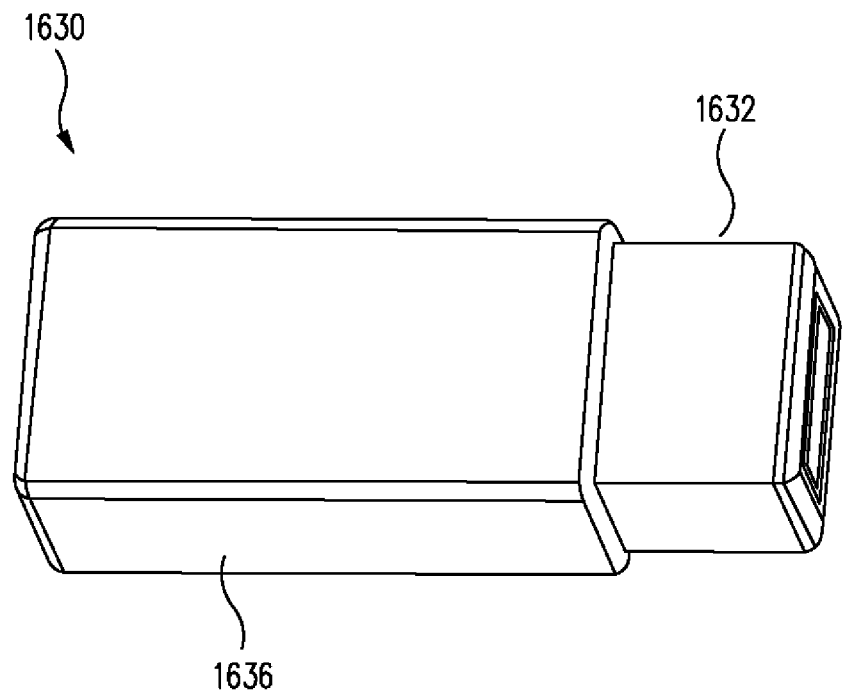
FIG. 16A-C are representations of a portable key for use with a lock according to embodiments of the disclosure.
Figure 16B:
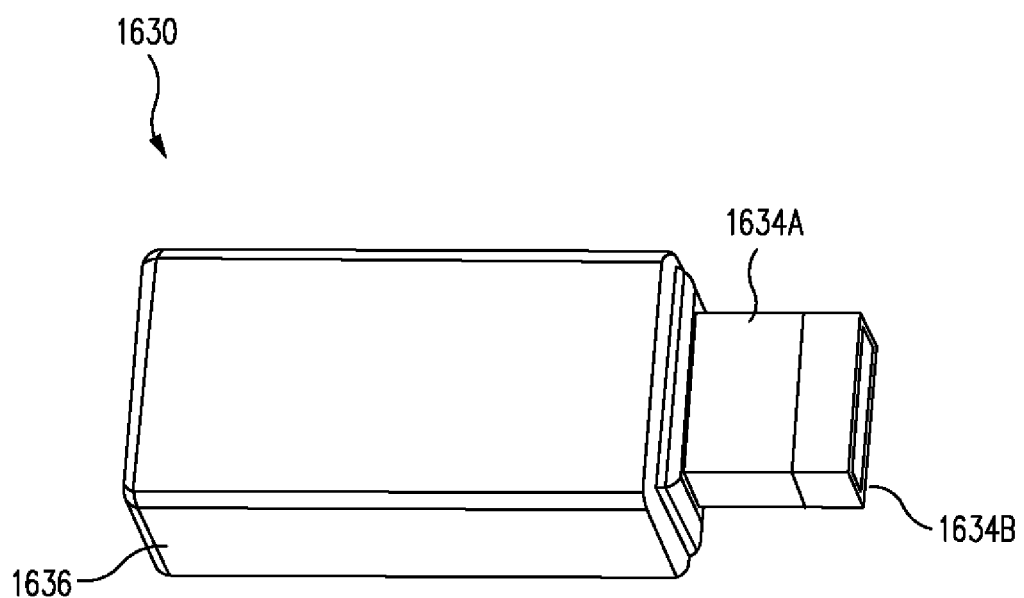
Figure 16C:
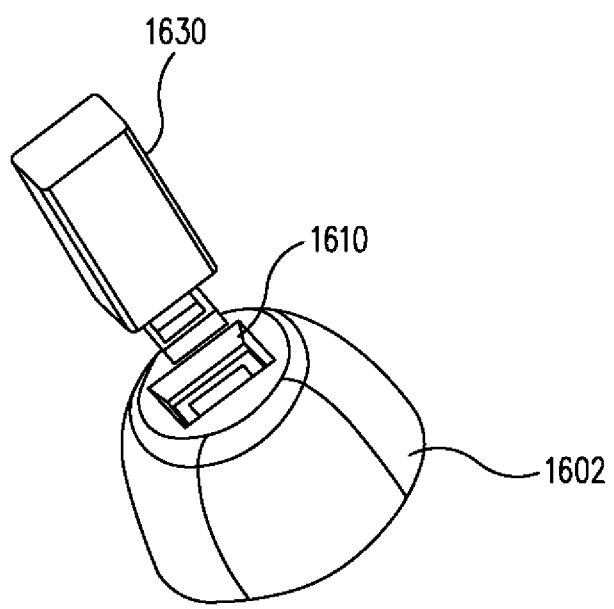

FIG. 16A-C are representations of a portable key for use with a lock according to embodiments of the disclosure. FIGS. 16A and 16B illustrate a key 1630 with a body 1636, a protective cover 1632, and key elements 1634A and 1634B. As shown in FIG. 16C, key 1630 may be inserted into a receptacle 1610 of a lock 1602 for authentication.

Protective cover 1632 may cover and protect key elements 1634A and 1634B when extended and may retract into body 1636 when key 1630 is used for authentication. Key elements 1634A and 1634B may be elements with different opacities, colors, or other characteristics and may be configured to, individually or in combination, affect signals passing through key elements 1634A and 1634B. In certain embodiments, one or both of key elements 1634A and 1634B may be replaced by the user as desired. Thus, key 1630 may be used as keys for different authentication purposes (e.g., for authenticating of different accounts or for authenticating at different security levels) based on the key elements fitted.

Figure 17A:
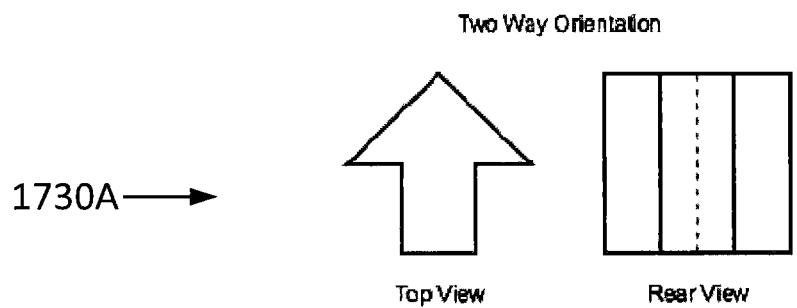
FIG. 17A-C are representations of keys for use with locks according to embodiments of the disclosure.
Figure 17B:
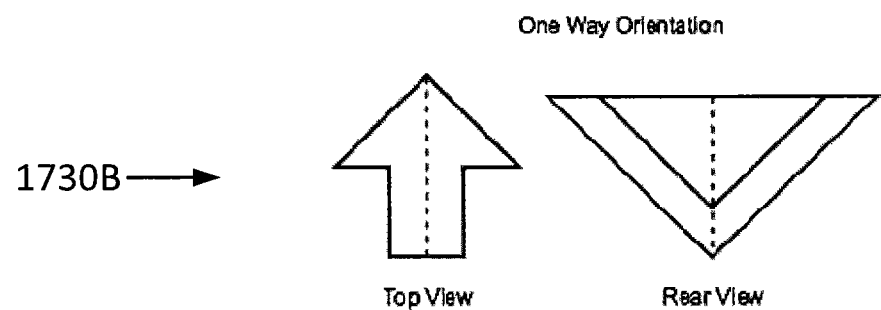
Figure 17C:
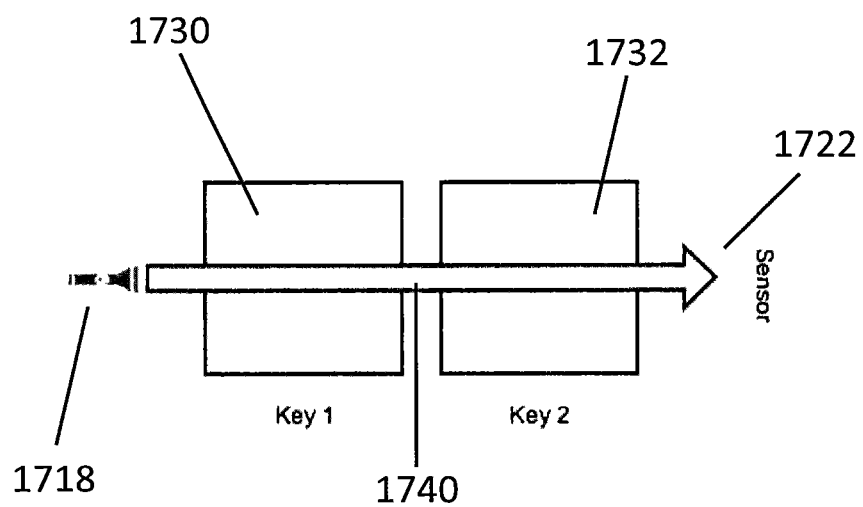

FIG. 17A-C are representations of keys for use with locks according to embodiments of the disclosure. FIGS. 17A and 17B illustrates keys 1730A and 1730B with different shapes. Key 1730A is a lock with a symmetric axis (e.g., the long axis). Other examples of keys with symmetric axes include rectangles, cubes, and other shapes. In such an example, the key can be inserted into the lock in a plurality of different orientations. The lock may distinguish the different orientations and authenticate the key differently based on the orientation (e.g. deny authentication or authenticate for different security levels). Key 1730B is an asymmetric key with no symmetrical axes. Key 1730B may be inserted in only one orientation into a lock.

FIG. 17C illustrates an embodiment where a plurality of keys is required. In FIG. 17C, an emitter 1718 may emit a light signal 1740 through keys 1730 and 1732 to be detected by sensor 1722. Each of keys 1730 and 1732 may affect the signal 1740. Thus, depending on the combination of keys disposed within the receptacle, the signal may be different and authentication (e.g., security levels) may be based on the combination of keys inserted.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order, hierarchy of steps, or device configuration in the techniques disclosed is an illustration of exemplary approaches. Based upon design preferences, it is understood that the specific order, hierarchy of steps, and/or device configuration in the techniques may be rearranged. Reference to "first," "second," or other numerical identifiers within the disclosure is for identification purposes only unless an explicit hierarchy is referenced.

What is claimed is:

1. An authentication device comprising:
   a lock comprising:
      a receptacle configured to receive a key;
      a lighting device configured to emit light that travels through the key when the key is received within the receptacle; and
      a light sensor configured to receive the light that travels through the key;
   an input device;
   a non-transitory memory; and
   one or more hardware processors coupled to the non-transitory memory and configured to read instructions from the non-transitory memory to cause the authentication device to perform operations comprising:
      detecting the key has been inserted into the receptacle;
      receiving, from a user via the input device, a first user color selection;
      setting a first color of the lighting device based on the first user color selection;
      causing the lighting device to emit light of the first color, wherein at least a portion of the light is emitted to travel through the key;
      receiving, from the light sensor, light data associated with the light of the first color after at least the portion of the light has traveled through the key;
      analyzing the light data; and
      authenticating the user based on the user color selection and the light data.

2. The authentication device of claim 1, wherein the analyzing the light data comprises determining a change within a characteristic of the light after at least the portion of the light has traveled through the key.

3. The authentication device of claim 2, wherein the change is based on a randomized characteristic of the key.

4. The authentication device of claim 3, wherein the key is an opaque key and wherein the randomized characteristic comprises bubbles within the key.

5. The authentication device of claim 1, wherein the operations further comprise:
   determining an orientation of the key based on the light data, wherein the authenticating is based on the orientation.

6. The authentication device of claim 1, wherein the operations further comprise:
   receiving, from the user via the input device, a light duration, wherein the lighting device emits light of the first color for the light duration, and wherein the authenticating is further based on the light duration.

7. The authentication device of claim 1, wherein the operations further comprise:
   receiving, from the user via the input device, a second user color selection;
   setting, after the lighting device emits light of the first color, a second color of the lighting device based on the second user color selection;
   causing the lighting device to emit light of the second color; and
   receiving, from the light sensor, light data associated with the light of the second color after at least the portion of the light has traveled through the key, wherein the authenticating the user is based on the light data associated with the first color and the second color.

8. The authentication device of claim 1, wherein the receptacle is further configured to receive an insert configured to modify the light traveling through the key.

9. A method comprising:
   receiving, from a user interface at a first time, a first authentication setting;
   causing an authentication device to pass first waves through a first key based on the first authentication setting;
   receiving, from the authentication device, first authentication data associated with passing the first waves through the first key;
   determining, from the first authentication data, a first characteristic of the first waves after passing through the first key; and
   authenticating a user based on the first characteristic;
   wherein the first waves comprise sound waves.

10. The method of claim 9, further comprising:
receiving, from the user interface at a second time, a second authentication setting;
causing the authentication device to pass second waves through a second key based on the second authentication setting;
receiving, from the authentication device, second authentication data associated with passing the second waves through the second key;
determining that the second authentication setting matches the first authentication setting;
analyzing the second authentication data;
determining, from the second authentication data, a second characteristic of the second waves after passing through the second key; and
determining, based on the second characteristic, that the second key matches the first key, wherein the authenticating the user is based on the second authentication setting matching the first authentication setting and the second key matching the first key.

11. The method of claim 10, wherein the second characteristic is a change of a characteristic of the waves after passing through the key, and wherein the change is due to a randomized characteristic of the key.

12. The method of claim 10, wherein the first waves comprise visible light, and wherein the first authentication data is based on detection of the visible light passing through the first key.

13. The method of claim 12, further comprising:
determining, from the first authentication data, a first ambient condition around the authentication device;
determining, from the second authentication data, a second ambient condition around the authentication device; and
determining that the first ambient condition matches the second ambient condition, wherein the authenticating the user is further based on the first ambient condition matching the second ambient condition.

14. The method of claim 12, further comprising:
determining an orientation of the second key based on the second authentication data, wherein the authenticating the user is further based on the orientation of the second key.

15. A non-transitory machine-readable medium having stored thereon machine-readable instructions executable to cause a machine to perform operations comprising:
receiving, from a user via an input device, an authentication input;
determining that a key has been received by an authentication device;
causing the authentication device to emit light towards the key;
receiving authentication data from the authentication device based on the emitting the light towards the key;
determining a characteristic of the light from the authentication data; and authenticating the user based on the authentication input and the authentication data;
wherein the authentication input is a color selection for the light.

16. The non-transitory machine-readable medium of claim 15, wherein the determining the characteristic comprises analyzing wavelength characteristics of the light to determine a color of the light.

17. The non-transitory machine-readable medium of claim 15, wherein the key is a first key, the authentication data is first authentication data, the characteristic is a first characteristic, and the operations further comprise:
determining that a second key has been received by an authentication device;
causing the authentication device to emit light towards the second key;
receiving second authentication data from the authentication device based on the emitting the light towards the second key; and
determining a second characteristic of the light from the second authentication data, wherein the authenticating the user is further based on the second authentication data.

18. The non-transitory machine-readable medium of claim 15, wherein the operations further comprise:
determining an orientation of the key received by the authentication device; and
authorizing a first user function based on the orientation of the key.

* * * * *